United States Patent
Tseng

(10) Patent No.: US 9,505,185 B2
(45) Date of Patent: Nov. 29, 2016

(54) LENS MOLD AND METHOD FOR MANUFACTURING LENSES UTILIZING THE LENS MOLD

(71) Applicant: HON HAI PRECISION INDUSTRY CO., LTD., New Taipei (TW)

(72) Inventor: Yung-Chang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 571 days.

(21) Appl. No.: 13/965,198

(22) Filed: Aug. 13, 2013

(65) Prior Publication Data

US 2014/0246796 A1   Sep. 4, 2014

(30) Foreign Application Priority Data

Mar. 1, 2013   (TW) ............................. 102107142 A

(51) Int. Cl.
*B29D 11/00* (2006.01)
*B29C 45/37* (2006.01)

(52) U.S. Cl.
CPC ....... *B29D 11/00326* (2013.01); *B29C 45/372* (2013.01)

(58) Field of Classification Search
CPC ..................... B29D 11/00326; B29C 45/372
See application file for complete search history.

(56) References Cited

U.S. PATENT DOCUMENTS 5,938,989 A * 8/1999 Hambright ....... B29D 11/00298
264/1.32
7,402,032 B2 * 7/2008 Tu ....................... B29C 33/3842
264/1.32

* cited by examiner

*Primary Examiner* — Mathieu Vargot
(74) *Attorney, Agent, or Firm* — Zhigang Ma

(57) ABSTRACT

A lens mold includes a bottom mold and a top mold joining with the bottom mold. The bottom mold defines a first through hole. The top mold defines a second through hole. The lens mold further includes a bottom mold core and a top mold core. The bottom mold core is detachably received in the first through hole of the bottom mold. The top mold core is detachably received in the second through hole of the top mold. A plurality of microstructures is formed on a top surface of the bottom mold core near the top mold core to form a plurality of microstructures on a bottom surface of a lens formed by the lens mold. A method for manufacturing the lens with the lens mold is also provided. The lens is used as a secondary optical element for an LED.

14 Claims, 3 Drawing Sheets

LENS MOLD AND METHOD FOR MANUFACTURING LENSES UTILIZING THE LENS MOLD

BACKGROUND

1. Technical Field

The present disclosure generally relates to a mold and method for manufacturing an optical element utilizing the mold, and particularly to a lens mold and a method for manufacturing a lens utilizing the lens mold, wherein the lens is used as secondary optical element for an LED light source.

2. Description of the Related Art

LEDs have many advantages, such as high luminosity, low operational voltage, low power consumption, compatibility with integrated circuits, faster switching, long term reliability, and environmental friendliness which have promoted their wide use as a light source.

The conventional LED generally generates a smooth round light field with a radiation angle of 90 degrees (−45 degrees to 45 degrees), wherein the light intensity is concentrated at a center of the conventional LED (i.e., 0 degree). The intensity of light emitted by the conventional LED is unevenly distributed, and will dramatically decrease when the radiation angle is beyond the range of 90 degrees. A lens which is used as a secondary optical element is usually matched with the LED to get even light outputs by refracting light at center to periphery.

A typical lens includes an incident surface, a bottom surface at a periphery of the incident surface and a light outputting surface opposite to the incident surface. To satisfy various illumination requirements, particularly to enable the light to be refracted at a large degree, the light outputting surface is usually configured with severely changing curvature for diffusing light towards different angles. However, due to the severely changing curvature of the outputting surface of the lens, part of the light will be totally reflected several times in the lens, which finally causes undesired light loss of the LED. As such, microstructures are conventionally formed at a bottom of the lens to avoid total internal reflection of light, thereby improving the light radiation efficiency of the LED.

When manufacturing lenses with a lens mold, the lens mold is specially designed according to desired microstructures of the lenses. However, the specially designed lens mold is unsuitable for manufacturing lenses with other different microstructures. So, when various types of lenses are manufactured, various different lens molds are needed, whereby a manufacturing cost of the lenses is high.

Therefore, it is desirable to provide a lens mold which can overcome the above-described problems.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present lens mold. Moreover, in the drawings, all the views are schematic, and like reference numerals designate corresponding parts throughout the views.

DETAILED DESCRIPTION

Figure 1:
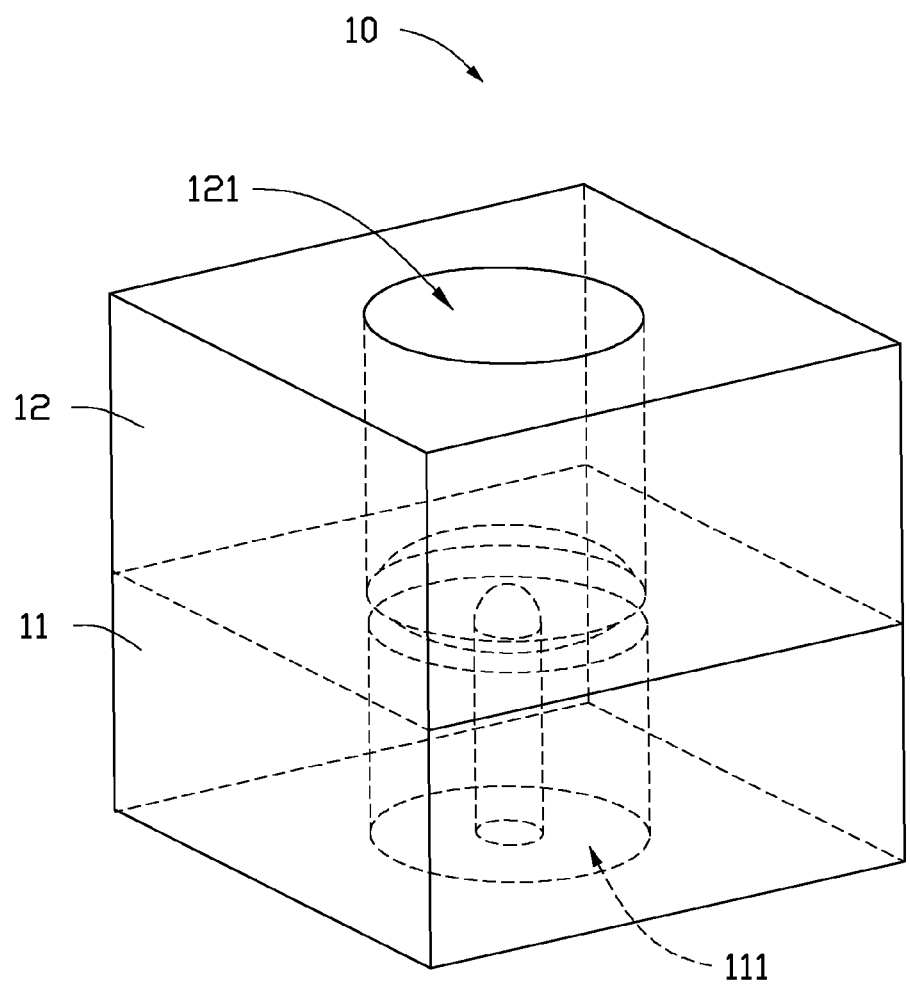
FIG. 1 is a schematic, assembled view of a lens mold in accordance with an exemplary embodiment of the present disclosure.
Figure 2:
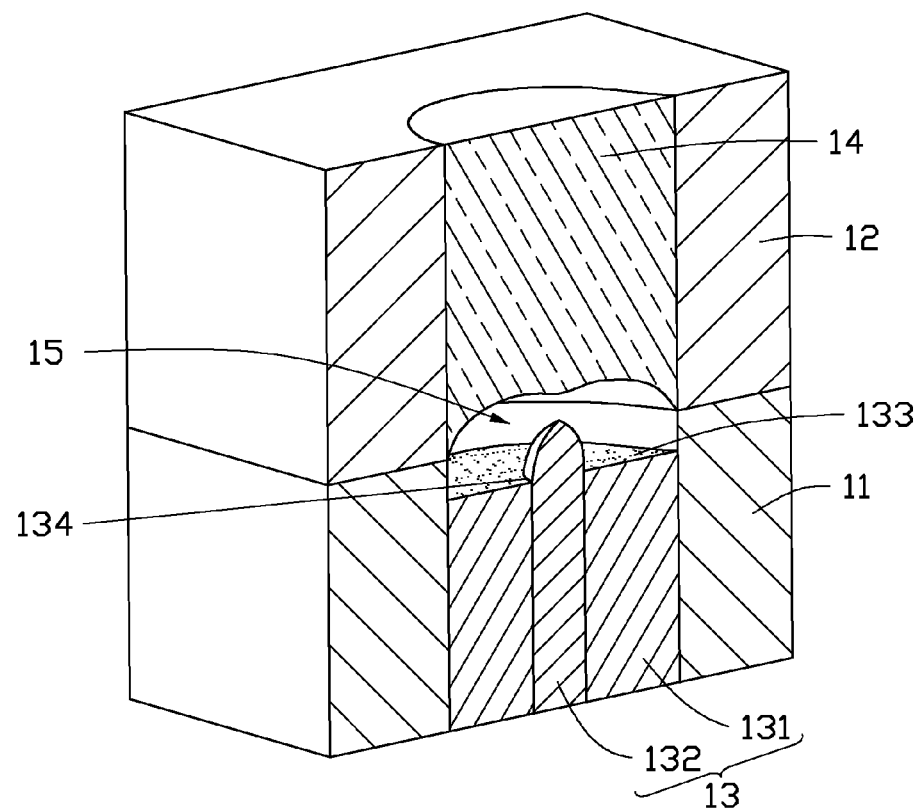
FIG. 2 is a cross-sectional view of the lens mold of FIG. 1.
Figure 3:
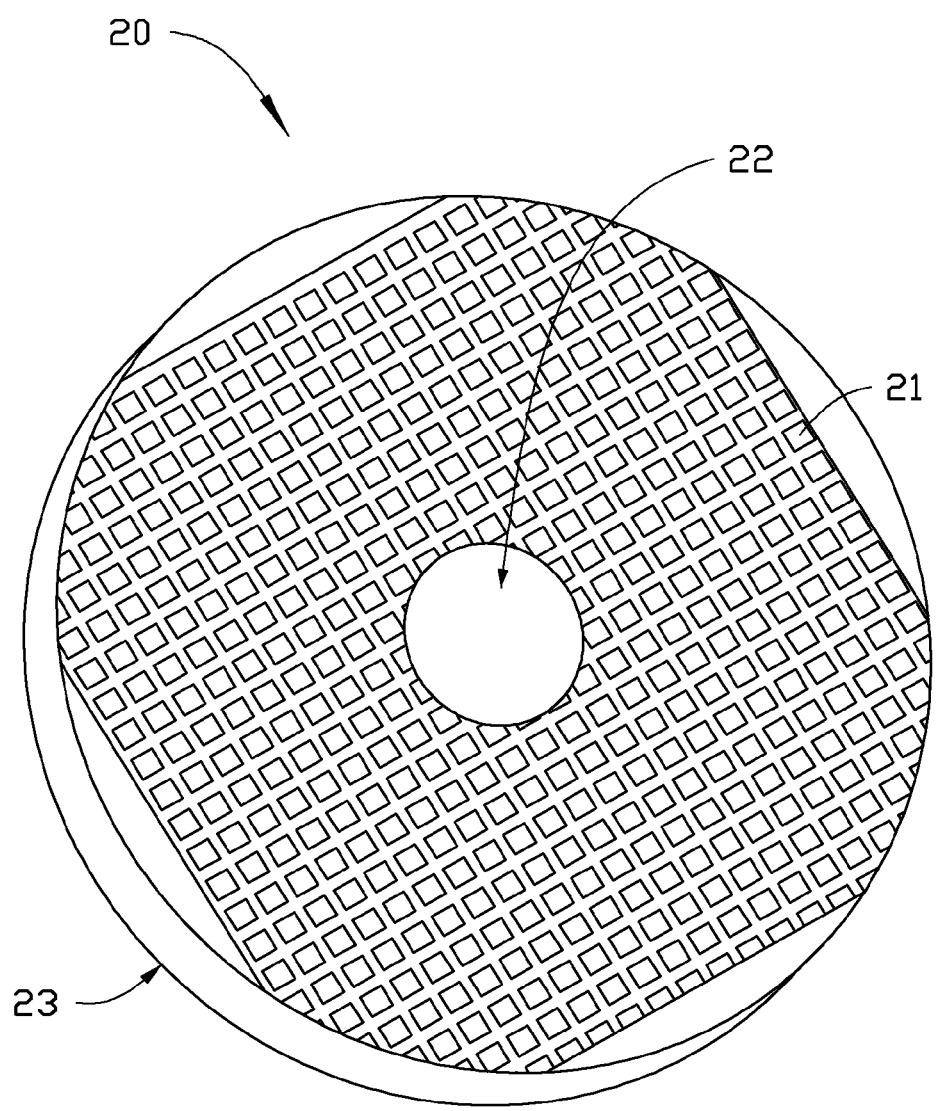
FIG. 3 is a schematic view of a lens with microstructures formed at a bottom thereof.

Referring to FIGS. 1-3, a lens mold 10 for manufacturing a lens 20 with microstructures formed at a bottom thereof in accordance with an embodiment is provided. The lens mold 10 includes a bottom mold 11, a top mold 12 engaging with the bottom mold 11, a bottom mold core 13 and a top mold core 14. The lens 20 is used as a secondary optical element for an LED light source (not shown).

Specifically, a first through hole 111 is defined at a center of the bottom mold 11. In this embodiment, the bottom mold 11 is rectangular, and the first through hole 111 is cylindrical. A second through hole 121 is defined at a center of the top mold 12 corresponding to the first through hole 111. The second through hole 121 and the first through hole 111 are communicated with each other. In this embodiment, a shape of the top mold 12 is the same as that of the bottom mold 11. The second through hole 121 is cylindrical. A size of the second through hole 121 is the same as that of the first through hole 111.

The bottom mold core 13 is detachably received in the first through hole 111 of the bottom mold 11. The bottom mold core 13 includes a frosting mold core 131 and an optical mold core 132. An outer, peripheral surface of the frosting mold core 131 engages an inner surface of the bottom mold 11 defining the first through hole 111. A frosting pattern 133 is formed at a top surface of the frosting mold core 133. That is, a plurality of microstructures (for example, micro-protrusions) is formed at the top surface of the frosting mold core 131. A height of the frosting mold core 131 is smaller than that of the bottom mold 11. A bottom surface of the frosting mold core 131 is coplanar with a bottom surface of the top mold 12. A top surface of the frosting mold core 131 is below a top surface of the bottom mold 11 to define a space between the top surface of the frosting mold core 131 and the top surface of the bottom mold 11. A positioning hole 134 is defined at a center of the frosting mold core 131. The optical mold core 132 is received in the positioning hole 134 with a top end of the optical mold core 132 is extended upwardly beyond and exposed out of the top surface of the frosting mold core 131. A bottom end of the optical mold core 132 is received in the positioning hole 134. A top end surface of the optical mold core 132 is located higher than the top surface of the bottom mold 11. The bottom end of the optical mold core 132 is cylindrical. The top end of the optical mold core 132 is hemispherical. In this embodiment, the frosting mold core 131 is cylindrical.

The top mold core 14 is detachably received in the second through hole 121 of the top mold 12. A bottom surface of the top mold core 14 is concaved upwardly. An outer periphery of the bottom surface of the top mold core 14 is coplanar with the top surface of the bottom mold 11. Specifically, the bottom surface of the top mold core 14 has a seagull wing-shaped profile with two arced sides and a center extended toward the bottom mold 11. In this embodiment, a top surface of the top mold core 14 is coplanar with a top surface of the top mold 12.

When the bottom mold 11 and the top mold 12 are assembled together, the first through hole 111 and the second through hole 121 are communicated with each other, the bottom mold core 13, the top mold core 14 and the bottom mold 11 are engaged together to form a cavity 15 for forming the lens 20 by injection molding of plastic material into the cavity 15. The plastic material can be PC (polycarbonate) or PMMA (polymethyl methacrylate). Particularly referring to FIG. 2, the top mold core 14 is spaced form the bottom mold core 13, the top surface of the bottom mold core 13 is employed to configure the bottom surface of the lens 20. The bottom surface of the top mold core 14 is employed to configure a light outputting surface 23 of the lens 20. Since the frosting pattern 133 is formed on the top surface of the bottom mold core 13, a plurality of microstructures 21 is correspondingly formed on the bottom surface of the lens 20. As the optical mold core 132 extends upwardly beyond the top surface of the bottom mold 11, a center of the bottom surface of the lens 20 is recessed upwardly to form a light incident surface 22 defining a cavity for receiving the LED light source therein. In addition, since the bottom surface of the top mold core 14 is concave, the lens 20 correspondingly has a convex light outputting surface 23 having a profile corresponding to the profile of the bottom surface of the top mold core 14.

The bottom mold 11 and the bottom mold core 13 of the lens mold 11 can be separated from each other, and the top mold 12 and the top mold core 14 can be separated from each other. In the process of assembling the lens mold 10 to form the cavity 15, the frosting pattern 133 is formed on the top surface of the frosting mold core 131, correspondingly the lens 20 has microstructure 21 formed on the bottom surface thereof. Simultaneously the shape of the optical mold core 132 and the shape of the bottom surface of the top mold core 14 enable the lens 20 to have the light incident surface 22 and the light outputting surface 23 as required. The bottom mold core 13 and the top mold core 14 can be replaced to form different type of lens 20 with various optical needs, as such there is no need to design a whole mold corresponding to each type of lens 20; accordingly, the lens mold 10 has a versatility and a manufacturing cost of the lens 20 is low.

Alternatively, the bottom periphery of the top mold core 14 is not coplanar with the bottom surface of the top mold 12, and the bottom mold 11, the top mold 12, the bottom mold core 13 and the top mold core 14 are engaged together to form the cavity. Alternatively, the bottom mold 11 and the top mold 12 are integrally formed.

The disclosure also provides a method for manufacturing the lens 20 by injection molding with the lens mold 10 which includes following steps.

The lens mold 10 is provided; the lens mold 10 includes the bottom mold 11, the top mold 12, the bottom mold core 13 and the top mold core 14. The bottom mold 11 defines the first through hole 111. The top mold 12 defines the second through hole 121. The bottom mold core 13 includes the frosting mold core 131 and the optical mold core 132. A frosting pattern is formed on the top surface of the frosting mold core 131; that is a plurality of microstructures is formed on the top surface of the frosting mold core 131. The positioning hole 134 is defined at a center of the frosting mold core 131. The bottom surface of the top mold core 14 is concave.

The lens mold 10 is assembled. Specifically, the optical mold core 132 is arranged and received in the positioning hole 134. The top end of the optical mold core 132 is extended upwardly out of the positioning hole 134, and the part of the optical mold core 132 exposed out of the positioning hole 134 is hemisphere-shaped. The optical mold core 132 and the frosting mold core 131 are arranged in the first through hole 111. A height of the frosting mold core 131 is slightly smaller than that of the bottom mold 11. The top end of the optical mold core 132 extends beyond the top surface of the bottom mold 11. In this embodiment, the bottom surface of the optical mold core 132, the bottom surface of the frosting mold core 131 and the bottom surface of the bottom mold 11 are coplanar.

The top mold core 14 is received in the second through hole 121 of the top mold 12. In this embodiment, the bottom periphery of the top mold core 14 is coplanar with the bottom surface of the top mold 12, and the top surface of the top mold core 14 is coplanar with the top surface of the top mold 12.

The bottom mold 11 and the top mold 12 are matched together. The first through hole 111 and the second through hole 121 are communicated with each other. The bottom mold core 13, the top mold core 14 and the bottom mold 11 are engaged together to form the cavity 15.

Transparent resin material is injected into the cavity 15 via an injecting channel (not shown), and the cavity 15 is full filled with the resin material.

The resin material is solidified to form the lens 20 with the microstructures 21 formed on the bottom surface of the lens 20. The lens 20 is removed from the lens mold 10.

Alternatively, the bottom periphery of the top mold core 14 is not coplanar with the bottom surface of the top mold 12, and the bottom mold 11, the top mold 12, the bottom mold core 13 and the top mold core 14 are engaged together to form the cavity 15. Alternatively, the bottom mold 11 and the top mold 12 are integrally formed.

It is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

What is claimed is:

1. A lens mold for manufacturing a lens for use as a secondary optical element for an LED (light emitting diode), comprising:
    a bottom mold defining a first through hole;
    a top mold matching with the bottom mold, the top mold defining a second through hole;
    a bottom mold core detachably received in the first through hole of the bottom mold;
    a top mold core detachably received in the second through hole of the top mold;
    wherein a plurality of microstructures is formed on a top surface of the bottom mold core near the top mold core, the microstructures being configured for forming a plurality of microstructures on a bottom surface of the lens formed by the lens mold;
    wherein the bottom mold core is spaced from the top mold core, the bottom mold core comprising a frosting mold core, the microstructures being formed on a top surface of the frosting mold core; and
    wherein the bottom mold core further comprises an optical mold core, a positioning hole being defined at a center of the frosting mold core, the optical mold core being detachably arranged in the positioning hole, a part of the optical mold core near the top mold core being extended upwardly beyond the top surface of the frosting mold core.

2. The lens mold of claim 1, wherein the part of the optical mold core extending above and exposed out of the top surface of the frosting mold core is hemisphere-shaped.

3. The lens mold of claim 2, wherein the first through hole and the second through hole are communicated with each other, and a size of the first through hole is equal to that of the second through hole.

4. The lens mold of claim 3, wherein a top end face of the optical mold core near the top mold core extends upwardly beyond a top surface of the bottom mold, a top surface of the frosting mold core is below the top surface of the bottom mold to define a space between the top surface of the frosting mold core and the top surface of the bottom mold.

5. The lens mold of claim 4, wherein a bottom surface of the optical mold core, a bottom surface of the frosting mold core and a bottom surface of the bottom mold are coplanar, and a top surface of the top mold core and a top surface of the top mold are coplanar.

6. The lens mold of claim 3, wherein a bottom surface of the top mold core is concave, a bottom periphery of the top mold core and the bottom surface of the top mold being coplanar, the bottom mold core, the top mold core and the bottom mold being engaged together to form a cavity for forming the lens.

7. The lens mold of claim 3, wherein the bottom mold and the top mold are integrally formed.

8. A manufacturing method for manufacturing a lens for use as a secondary optical element for an LED, comprising steps:
providing a lens mold, the lens mold comprising a bottom mold having a first through hole, a top mold having a second through hole, a bottom mold core having a plurality of microstructures on a top surface thereof, a top mold core detachably received in the second through hole of the top mold;
arranging the bottom mold core and the top mold core respectively detachably received in the first through hole and the second through hole, and forcing the bottom mold abutting against the top mold, thereby making the top mold core, the bottom mold core and the bottom mold cooperatively defining a cavity thereamong;
injecting transparent resin material into the cavity and solidifying the transparent resin material in the cavity to form the lens; and
removing the lens from the lens mold;
wherein the bottom mold core is spaced from the top mold core, the bottom mold core comprising a frosting mold core, the microstructures being formed on a top surface of the frosting mold core; and
wherein the bottom mold core further comprises an optical mold core, a positioning hole being defined at a center of the frosting mold core, the optical mold core being detachably arranged in the positioning hole, a part of the optical mold core near the top mold core being extended upwardly beyond the top surface of the frosting mold core.

9. The manufacturing method for manufacturing the lens of claim 8, wherein the part of the optical mold core exposed out of the top surface of the frosting mold core is hemisphere-shaped.

10. The manufacturing method for manufacturing the lens of claim 9, wherein a size of the first through hole is equal to that of the second through hole.

11. The manufacturing method for manufacturing the lens of claim 10, wherein a top end face of the optical mold core near the top mold core extends upwardly beyond a top surface of the bottom mold, and a top surface of the frosting mold core is below the top surface of the bottom mold to define a space defined between the top surface of the frosting mold core and the top surface of the bottom mold.

12. The manufacturing method for manufacturing the lens of claim 11, wherein a bottom surface of the optical mold core, a bottom surface of the frosting mold core and a bottom surface of the bottom mold are coplanar, and a top surface of the top mold core and a top surface of the top mold are coplanar.

13. The manufacturing method for manufacturing the lens of claim 10, wherein a bottom surface of the top mold core is concave, a bottom periphery of the top mold core and the bottom surface of the top mold are coplanar, the bottom mold core, the top mold core and the bottom mold being engaged together to form the cavity for forming the lens.

14. The manufacturing method for manufacturing the lens of claim 10, wherein the bottom mold and the top mold are integrally formed.

* * * * *